UNITED STATES PATENT OFFICE.

WILLIAM BOYD, OF GALVESTON, TEXAS.

FIRE-KINDLER.

SPECIFICATION forming part of Letters Patent No. 251,023, dated December 20, 1881.

Application filed October 27, 1881. (No specimens.)

*To all whom it may concern:*

Be it known that I, WILLIAM BOYD, of Galveston, in the county of Galveston and State of Texas, have invented a new and useful Composition of Matter to be used for Kindling Fires, of which the following is a specification.

My composition consists of the following ingredients, combined in the proportions stated, or in substantially the same proportions, viz: sawdust, one part; common resin, three parts; pine-tar, one part.

The resin and tar are reduced by heat to a liquid state and mixed together. The sawdust is then added and mixed, and all the ingredients are thoroughly incorporated with each other. The mass is then molded into bricks by being poured into molds in which partitions are arranged, which partly sever or separate the mass in the bricks, so that portions may be broken off with facility for use when a quantity smaller than a brick will be sufficient, it being understood that the bricks are allowed to become cool or hard before being used.

By these means a very efficient and desirable fire-kindler is produced in convenient form for use and transportation.

What I claim, and desire to secure by Letters Patent of the United States, is—

The herein-described composition of matter to be used for kindling fires, consisting of sawdust, common resin, and pine-tar, in the proportions substantially the same as specified.

WILLIAM BOYD.

Witnesses:
   JOHN J. HAND,
   W. A. ZIEGLER.